(12) United States Patent
Kato et al.

(10) Patent No.: US 11,377,126 B2
(45) Date of Patent: Jul. 5, 2022

(54) VEHICLE CONTROL SYSTEM

(71) Applicant: HONDA MOTOR CO., LTD., Tokyo (JP)

(72) Inventors: Daichi Kato, Wako (JP); Kanta Tsuji, Wako (JP); Tadashi Naruse, Wako (JP); Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 191 days.

(21) Appl. No.: 16/831,150

(22) Filed: Mar. 26, 2020

(65) Prior Publication Data

US 2020/0307646 A1 Oct. 1, 2020

(30) Foreign Application Priority Data

Mar. 29, 2019 (JP) .............................. JP2019-067686

(51) Int. Cl.
*B60W 60/00* (2020.01)
*B60W 40/08* (2012.01)
*G05D 1/00* (2006.01)

(52) U.S. Cl.
CPC .... *B60W 60/0059* (2020.02); *B60W 60/0054* (2020.02); *B60W 60/0061* (2020.02); *B60W 2040/0818* (2013.01); *B60W 2540/221* (2020.02); *B60W 2540/229* (2020.02); *B60W 2540/26* (2013.01); *G05D 1/0061* (2013.01)

(58) Field of Classification Search
CPC ......... B60W 60/0059; B60W 60/0061; B60W 60/0054; B60W 2540/229; B60W 2540/221; B60W 2040/0818; B60W 2540/26; G05D 1/0061
See application file for complete search history.

(56) References Cited

U.S. PATENT DOCUMENTS

| | | | |
|---|---|---|---|
| 9,703,289 B2 | 7/2017 | Sato et al. | |
| 2016/0033964 A1* | 2/2016 | Sato | B60K 28/06 701/24 |
| 2016/0252904 A1* | 9/2016 | Sakai | B60W 50/14 701/26 |
| 2019/0329791 A1* | 10/2019 | Oba | B60W 50/12 |

FOREIGN PATENT DOCUMENTS

JP 6201927 B2 3/2016

* cited by examiner

*Primary Examiner* — Anne Marie Antonucci
*Assistant Examiner* — Jingli Wang
(74) *Attorney, Agent, or Firm* — Armstrong Teasdale LLP (57) ABSTRACT

In a vehicle control system (1) configured for autonomous driving, a control unit (15) invokes an autonomous stopping mode when an intervention detection unit (10, 11, 13, 33) has failed to detect an acceptance of a driving intervention request by the driver when the driving intervention request is notified by a notification interface (31, 32), and the control unit restricts a functionality of the autonomous driving after the autonomous stopping mode has been invoked due to a driver's failure.

7 Claims, 3 Drawing Sheets

VEHICLE CONTROL SYSTEM

TECHNICAL FIELD

The present invention relates to a vehicle control system configured for autonomous driving.

BACKGROUND ART

SAE J3016 defines six levels of autonomous driving. Level 0 corresponds to conventional manual driving, and level 5 corresponds to fully autonomous driving which requires no human intervention. However, depending on the surrounding environment, human invention may be required. At such a time, the control system of the vehicle makes a handover request to the occupant, and request the occupant to take over the responsibility of driving. The potential driver however may not be able to take over the driving due to physical ailment or for other reasons. In such a situation, the control system executes a minimal risk maneuver (MRM) whereby the vehicle is autonomously driven to a safe part of the road, and is brought to a stop at a selected stop position.

JP6201927B2 discloses a vehicle control system which executes autonomous driving in certain regions such as expressways, and lets the driver manually operate the vehicle in other regions such as ordinary roads. When the driver is unable to take over the responsibility of driving, the vehicle control system brings the vehicle autonomously to a stop in an evacuation area which is determined in an emergency parking zone or a road shoulder located nearer to the current position than the area where the transfer of the driving responsibility was expected to take place.

An MRM is an extreme measure that is invoked when the drive fails to take over the driving responsibility in a situation where the continuation of the autonomous driving is determined to be undesirable. Even though the vehicle may be able to bring the vehicle to come to a stop autonomously with an MRM, unless there is compelling reason, an MRM should be avoided. In particular, an abusive use of the autonomous stopping mode should be avoided.

SUMMARY OF THE INVENTION

In view of such a problem of the prior art, a primary object of the present invention is to provide a vehicle control system configured for autonomous driving that prevents an abusive use of an autonomous stopping mode, and encourages a driver to properly accept a driving intervention request.

To achieve such an object, the present invention provides a a vehicle control system (1) configured for autonomous driving, comprising:

a control unit (15) for steering, accelerating and decelerating a vehicle;

a notification interface (12) configured to notify a driving intervention request issued by the control unit to a driver of the vehicle; and an intervention detection unit (10, 11, 13, 33) configured to detect an acceptance of the driving intervention request by the driver;

wherein the autonomous driving includes an autonomous driving mode in which the vehicle is operated without requiring an intervention of the driver at least in regard to steering or acceleration/deceleration of the vehicle, and an autonomous stopping mode in which the vehicle is brought to a stop in a prescribed stop area when it is detected that the control unit or the driver has become incapable of properly maintaining a traveling state of the vehicle; and wherein the control unit invokes the autonomous stopping mode when the intervention detection unit has failed to detect an acceptance of the driving intervention request by the driver when the driving intervention request is notified by the notification interface, and the control unit restricts a functionality of the autonomous driving after the autonomous stopping mode has been invoked.

By thus imposing a penalty on the driver when the autonomous driving mode is invoked, the driver is encouraged to accept the driving intervention request in a timely fashion, and is discouraged from abusing the autonomous driving mode.

Preferably, the vehicle control system further comprises a driver identification unit (61) configured to identify the driver, the control unit being configured to manage a restriction extent to which the functionality of the autonomous driving has been restricted for each identified driver.

Since the functionality restriction extent is managed for each driver, the penalty is prevented from being unfairly imposed on the drivers.

Preferably, the vehicle control unit further comprises an occupant monitoring device (11) configured to monitor the driver, wherein the control unit includes an occupant state determination unit to determine a state of the driver according to information obtained from the occupant monitoring device, and wherein the control unit restricts the functionality when the intervention detection unit has failed to detect an acceptance of the driving intervention request by the driver due to a fault of the driver, and does not restrict the functionality when the intervention detection unit has failed to detect an acceptance of the driving intervention request by the driver not due to a fault of the driver.

Thus, those drivers who failed to properly accept the driving intervention request are penalized so that the penalty is prevented from being unfairly imposed on the drivers.

Preferably, the functionality is restricted to a greater extent when the driver has deactivated the autonomous stopping mode after the vehicle has come to a stop than when the driver has deactivated the autonomous stopping mode while the vehicle is traveling, and/or the functionality is restricted to a greater extent when an occupant other than the driver has deactivated the autonomous stopping mode than when the driver has deactivated the autonomous stopping mode.

Since the content of the functionality restriction is varied according to the seriousness of the situation, the driver is encouraged to accept the driving intervention request in a rational manner.

Preferably, the control unit is configured to allow the restricted functionality to be unrestricted by an authorized party.

The driver is required to visit the authorized party such as a car dealer to have the functionality restriction to be removed so that the drive can be properly penalized without being unduly inconvenienced.

Preferably, the control unit is configured to allow the restricted functionality to be unrestricted with elapsing of time, and/or the control unit is configured to allow the restricted functionality to be unrestricted with an increase in a number of incidences of using the vehicle.

The driver has to use the vehicle properly for a prescribed time period or for a prescribed number of times before the penalty is lifted so that the drive can be properly penalized without being unduly inconvenienced.

Preferably, the control unit is configured to output contents of a part of the functionality that is restricted and/or a part of the functionality that is not restricted.

The driver can be thus made aware of the state of the restriction on the functionality of the autonomous driving.

The present invention thus provides a vehicle control system configured for autonomous driving that prevents an abusive use of an autonomous stopping mode, and encourages a driver to properly accept a driving intervention request.

DESCRIPTION OF THE PREFERRED EMBODIMENT(S)

A vehicle control system according to a preferred embodiment of the present invention is described in the following with reference to the appended drawings. The following disclosure is according to left-hand traffic. In the case of right-hand traffic, the left and the right in the disclosure will be reversed.

Figure 1:
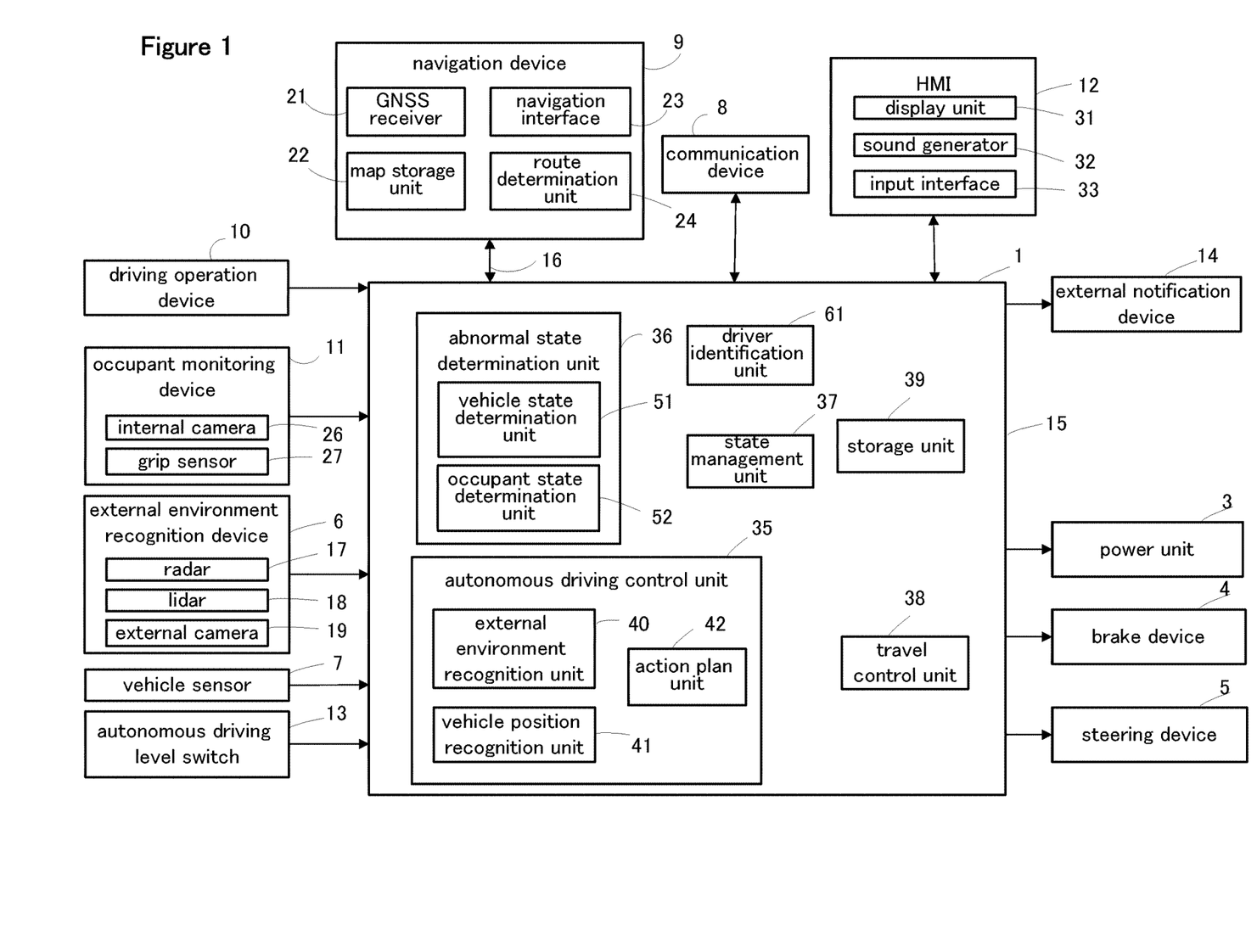
FIG. 1 is a functional block diagram of a vehicle on which a vehicle control system according to the present invention is mounted.

As shown in FIG. 1, the vehicle control system 1 according to the present invention is a part of a vehicle system 2 mounted on a vehicle. The vehicle system 2 includes a power unit 3, a brake device 4, a steering device 5, an external environment recognition device 6, a vehicle sensor 7, a communication device 8, a navigation device 9 (map device), a driving operation device 10, an occupant monitoring device 11, an HMI 12 (Human Machine Interface), an autonomous driving level switch 13, an external notification device 14, and a control unit 15. These components of the vehicle system 2 are connected to one another so that signals can be transmitted between them via a communication means such as CAN 16 (Controller Area Network).

The power unit 3 is a device for applying a driving force to the vehicle, and may include a power source and a transmission unit. The power source may consist of an internal combustion engine such as a gasoline engine and a diesel engine, an electric motor or a combination of these. The brake device 4 is a device that applies a braking force to the vehicle, and may include a brake caliper that presses a brake pad against a brake rotor, and an electrically actuated hydraulic cylinder that supplies hydraulic pressure to the brake caliper. The brake device 4 may also include a parking brake device. The steering device 5 is a device for changing a steering angle of the wheels, and may include a rack-and-pinion mechanism that steers the front wheels, and an electric motor that drives the rack-and-pinion mechanism. The power unit 3, the brake device 4, and the steering device 5 are controlled by the control unit 15.

The external environment recognition device 6 is a device that detects objects located outside of the vehicle. The external environment recognition device 6 may include a sensor that captures electromagnetic waves or light from around the vehicle to detect objects outside of the vehicle, and may consist of a radar 17, a lidar 18, an external camera 19, or a combination of these. The external environment recognition device 6 may also be configured to detect objects outside of the vehicle by receiving a signal from a source outside of the vehicle. The detection result of the external environment recognition device 6 is forwarded to the control unit 15.

The radar 17 emits radio waves such as millimeter waves to the surrounding area of the vehicle, and detects the position (distance and direction) of an object by capturing the reflected wave. Preferably, the radar 17 includes a front radar that radiates radio waves toward the front of the vehicle, a rear radar that radiates radio waves toward the rear of the vehicle, and a pair of side radars that radiates radio waves in the lateral directions.

The lidar 18 emits light such as an infrared ray to the surrounding part of the vehicle, and detects the position (distance and direction) of an object by capturing the reflected light. At least one lidar 18 is provided at a suitable position of the vehicle.

The external camera 19 can capture the image of the surrounding objects such as vehicles, pedestrians, guardrails, curbs, walls, median strips, road shapes, road signs, road markings painted on the road, and the like. The external camera 19 may consist of a digital camera using a solid-state imaging device such as a CCD and a CMOS. At least one external camera 19 is provided at a suitable position of the vehicle. The external camera 19 preferably includes a front camera that images the front of the vehicle, a rear camera that images the rear of the vehicle and a pair of side cameras that image the lateral views from the vehicle. The external camera 19 may consist of a stereo camera that can capture a three-dimensional image of the surrounding objects.

The vehicle sensor 7 may include a vehicle speed sensor that detects the traveling speed of the vehicle, an acceleration sensor that detects the acceleration of the vehicle, a yaw rate sensor that detects an angular velocity of the vehicle around a vertical axis, a direction sensor that detects the traveling direction of the vehicle, and the like. The yaw rate sensor may consist of a gyro sensor.

The communication device 8 allows communication between the control unit 15 which is connected to the navigation device 9 and other vehicles around the own vehicle as well as servers located outside the vehicle. The control unit 15 can perform wireless communication with the surrounding vehicles via the communication device 8. For instance, the control unit 15 can communicate with a server that provides traffic regulation information via the communication device 8, and with an emergency call center that accepts an emergency call from the vehicle also via the communication device 8. Further, the control unit 15 can communicate with a portable terminal carried by a person such as a pedestrian present outside the vehicle via the communication device 8.

The navigation device 9 is able to identify the current position of the vehicle, and performs route guidance to a destination and the like, and may include a GNSS receiver 21, a map storage unit 22, a navigation interface 23, and a route determination unit 24. The GNSS receiver 21 identifies the position (latitude and longitude) of the vehicle according to a signal received from artificial satellites (positioning satellites). The map storage unit 22 may consist of a per se known storage device such as a flash memory and a hard disk, and stores or retains map information. The navigation interface 23 receives an input of a destination or the like from the user, and provides various information to the user by visual display and/or speech. The navigation interface 23 may include a touch panel display, a speaker, and the like. In another embodiment, the GNSS receiver 21 is configured as a part of the communication device 8. The map storage unit 22 may be configured as a part of the control unit 15 or may be configured as a part of an external server that can communicate with the control unit 15 via the communication device 8.

The map information may include a wide range of road information which may include, not exclusively, road types such as expressways, toll roads, national roads, and prefectural roads, the number of lanes of the road, road markings such as the center position of each lane (three-dimensional coordinates including longitude, latitude, and height), road division lines and lane lines, the presence or absence of sidewalks, curbs, fences, etc., the locations of intersections, the locations of merging and branching points of lanes, the areas of emergency parking zones, the width of each lane, and traffic signs provided along the roads. The map information may also include traffic regulation information, address information (address/postal code), facility information, telephone number information, and the like.

The route determination unit 24 determines a route to the destination according to the position of the vehicle specified by the GNSS receiver 21, the destination input from the navigation interface 23, and the map information. When determining the route, in addition to the route, the route determination unit 24 determines the target lane which the vehicle will travel in by referring to the merging and branching points of the lanes in the map information.

The driving operation device 10 receives an input operation performed by the driver to control the vehicle. The driving operation device 10 may include a steering wheel, an accelerator pedal, and a brake pedal. Further, the driving operation device 10 may include a shift lever, a parking brake lever, and the like. Each element of the driving operation device 10 is provided with a sensor for detecting an operation amount of the corresponding operation. The driving operation device 10 outputs a signal indicating the operation amount to the control unit 15.

The occupant monitoring device 11 monitors the state of the occupant in the passenger compartment. The occupant monitoring device 11 includes, for example, an internal camera 26 that images an occupant sitting on a seat in the vehicle cabin, and a grip sensor 27 provided on the steering wheel. The internal camera 26 is a digital camera using a solid-state imaging device such as a CCD and a CMOS. The grip sensor 27 is a sensor that detects if the driver is gripping the steering wheel, and outputs the presence or absence of the grip as a detection signal. The grip sensor 27 may be formed of a capacitance sensor or a piezoelectric device provided on the steering wheel. The occupant monitoring device 11 may include a heart rate sensor provided on the steering wheel or the seat, or a seating sensor provided on the seat. In addition, the occupant monitoring device 11 may be a wearable device that is worn by the occupant, and can detect the vital information of the driver including at least one of the heart rate and the blood pressure of the driver. In this conjunction, the occupant monitoring device 11 may be configured to be able to communicate with the control unit 15 via a per se known wireless communication means. The occupant monitoring device 11 outputs the captured image and the detection signal to the control unit 15.

The external notification device 14 is a device for notifying to people outside of the vehicle by sound and/or light, and may include a warning light and a horn. A headlight (front light), a taillight, a brake lamp, a hazard lamp, and a vehicle interior light may function as a warning light.

The HMI 12 notifies the occupant of various kinds of information by visual display and speech, and receives an input operation by the occupant. The HMI 12 may include at least one of a display device 31 such as a touch panel and an indicator light including an LCD or an organic EL, a sound generator 32 such as a buzzer and a speaker, and an input interface 33 such as a GUI switch on the touch panel and a mechanical switch. The navigation interface 23 may be configured to function as the HMI 12.

The autonomous driving level switch 13 is a switch that activates autonomous driving as an instruction from the driver. The autonomous driving level switch 13 may be a mechanical switch or a GUI switch displayed on the touch panel, and is positioned in a suitable part of the cabin. The autonomous driving level switch 13 may be formed by the input interface 33 of the HMI 12 or may be formed by the navigation interface 23.

The control unit 15 may consist of an electronic control unit (ECU) including a CPU, a ROM, a RAM, and the like. The control unit 15 executes various types of vehicle control by executing arithmetic processes according to a computer program executed by the CPU. The control unit 15 may be configured as a single piece of hardware, or may be configured as a unit including a plurality of pieces of hardware. In addition, at least a part of each functional unit of the control unit 15 may be realized by hardware such as an LSI, an ASIC, and an FPGA, or may be realized by a combination of software and hardware.

The control unit 15 is configured to execute autonomous driving control of at least level 0 to level 3 by combining various types of vehicle control. The level is according to the definition of SAE J3016, and is determined in relation to the degree of machine intervention in the driving operation of the driver and in the monitoring of the surrounding environment of the vehicle.

In autonomous driving of level 0, the control unit 15 does not control the vehicle, and the driver performs all of the driving operations. Thus, autonomous driving of level 0 means a manual driving.

In autonomous driving of level 1, the control unit 15 executes a certain part of the driving operation, and the driver performs the remaining part of the driving operation. For example, autonomous driving level 1 includes constant speed traveling, inter-vehicle distance control (ACC; Adaptive Cruise Control) and lane keeping assist control (LKAS; Lane Keeping Assistance System). The level 1 autonomous driving is executed when various devices (for example, the external environment recognition device 6 and the vehicle sensor 7) required for executing the level 1 autonomous driving are all properly functioning.

In autonomous driving of level 2, the control unit 15 performs the entire driving operation. The level 2 autonomous driving is performed only when the driver monitors the surrounding environment of the vehicle, the vehicle is within a designated area, and the various devices required for performing the level 2 autonomous driving are all functioning properly.

In level 3 autonomous driving, the control unit 15 performs the entire driving operation. The level 3 autonomous driving requires the driver to monitor or be aware of the surrounding environment when required, and is executed only when the vehicle is within a designated area, and the various devices required for performing the level 3 autonomous driving are all functioning properly. The conditions under which the level 3 autonomous driving is executed may include that the vehicle is traveling on a congested road. Whether the vehicle is traveling on a congested road or not may be determined according to traffic regulation information provided from a server outside of the vehicle, or, alternatively, that the vehicle speed detected by the vehicle speed sensor is determined to be lower than a predetermined slowdown determination value (for example, 30 km/h) over a predetermined time period.

Thus, in the autonomous driving of levels 1 to 3, the control unit 15 executes at least one of the steering, the acceleration, the deceleration, and the monitoring of the surrounding environment. When in the autonomous driving mode, the control unit 15 executes the autonomous driving of level 1 to level 3. Hereinafter, the steering, acceleration, and deceleration operations are collectively referred to as driving operation, and the driving and the monitoring of the surrounding environment may be collectively referred to as driving.

In the present embodiment, when the control unit 15 has received an instruction to execute autonomous driving via the autonomous driving level switch 13, the control unit 15 selects the autonomous driving level that is suitable for the environment of the vehicle according to the detection result of the external environment recognition device 6 and the position of the vehicle acquired by the navigation device 9, and changes the autonomous driving level as required. However, the control unit 15 may also change the autonomous driving level according the input to the autonomous driving level switch 13.

As shown in FIG. 1, the control unit 15 includes an autonomous driving control unit 35, an abnormal state determination unit 36, a state management unit 37, a travel control unit 38, and a storage unit 39.

The autonomous driving control unit 35 includes an external environment recognition unit 40, a vehicle position recognition unit 41, and an action plan unit 42. The external environment recognition unit 40 recognizes an obstacle located around the vehicle, the shape of the road, the presence or absence of a sidewalk, and road signs according to the detection result of the external environment recognition device 6. The obstacles include, not exclusively, guardrails, telephone poles, surrounding vehicles, and pedestrians. The external environment recognition unit 40 can acquire the state of the surrounding vehicles, such as the position, speed, and acceleration of each surrounding vehicle from the detection result of the external environment recognition device 6. The position of each surrounding vehicle may be recognized as a representative point such as a center of gravity position or a corner positions of the surrounding vehicle, or an area represented by the contour of the surrounding vehicle.

The vehicle position recognition unit 41 recognizes a traveling lane, which is a lane in which the vehicle is traveling, and a relative position and an angle of the vehicle with respect to the traveling lane. The vehicle position recognition unit 41 may recognize the traveling lane according to the map information stored in the map storage unit 22 and the position of the vehicle acquired by the GNSS receiver 21. In addition, the lane markings drawn on the road surface around the vehicle may be extracted from the map information, and the relative position and angle of the vehicle with respect to the traveling lane may be recognized by comparing the extracted lane markings with the lane markings captured by the external camera 19.

The action plan unit 42 sequentially creates an action plan for driving the vehicle along the route. More specifically, the action plan unit 42 first determines a set of events for traveling on the target lane determined by the route determination unit 24 without the vehicle coming into contact with an obstacle. The events may include a constant speed traveling event in which the vehicle travels in the same lane at a constant speed, a preceding vehicle following event in which the vehicle follows a preceding vehicle at a certain speed which is equal to or lower than a speed selected by the driver or a speed which is determined by the prevailing environment, a lane changing event in which the vehicle change lanes, a passing event in which the vehicle passes a preceding vehicle, a merging event in which the vehicle merge into the traffic from another road at a junction of the road, a diverging event in which the vehicle travels into a selected road at a junction of the road, an autonomous driving end event in which autonomous driving is ended, and the driver takes over the driving operation, and a stop event in which the vehicle is brought to a stop when a certain condition is met, the condition including a case where the control unit 15 or the driver has become incapable of continuing the driving operation.

The conditions under which the action plan unit 42 invokes the stop event include the case where an input to the internal camera 26, the grip sensor 27, or the autonomous driving level switch 13 in response to an intervention request (a hand-over request) to the driver is not detected during autonomous driving. The intervention request is a warning to the driver to take over a part of the driving, and to perform at least one of the driving operation and the monitoring of the environment corresponding to the part of the driving that is to be handed over. The condition under which the action plan unit 42 invokes the stop even include the case where the action plan unit 42 has detected that the driver has become incapable of performing the driving while the vehicle is traveling due to a physiological ailment according to the signal from a pulse sensor, the internal camera or the like.

During the execution of these events, the action plan unit 42 may invoke an avoidance event for avoiding an obstacle or the like according to the surrounding conditions of the vehicle (existence of nearby vehicles and pedestrians, lane narrowing due to road construction, etc.).

The action plan unit 42 generates a target trajectory for the vehicle to travel in the future corresponding to the selected event. The target trajectory is obtained by sequentially arranging trajectory points that the vehicle should trace at each time point. The action plan unit 42 may generate the target trajectory according to the target speed and the target acceleration set for each event. At this time, the information on the target speed and the target acceleration is determined for each interval between the trajectory points.

The travel control unit 38 controls the power unit 3, the brake device 4, and the steering device 5 so that the vehicle traces the target trajectory generated by the action plan unit 42 according to the schedule also generated by the action plan unit 42.

The storage unit 39 is formed by a ROM, a RAM, or the like, and stores information required for the processing by the autonomous driving control unit 35, the abnormal state determination unit 36, the state management unit 37, and the travel control unit 38.

The abnormal state determination unit 36 includes a vehicle state determination unit 51 and an occupant state determination unit 52. The vehicle state determination unit 51 analyzes signals from various devices (for example, the external environment recognition device 6 and the vehicle sensor 7) that affect the level of the autonomous driving that is being executed, and detects the occurrence of an abnormality in any of the devices and units that may prevent a proper execution of the autonomous driving of the level that is being executed.

The occupant state determination unit 52 determines if the driver is in an abnormal state or not according to a signal from the occupant monitoring device 11. The abnormal state includes the case where the driver is unable to properly steer the vehicle in autonomous driving of level 1 or lower that requires the driver to steer the vehicle. That the driver is unable to steer the vehicle in autonomous driving of level 1 or lower could mean that the driver is not holding the steering wheel, the driver is asleep, the driver is incapacitated or unconscious due to illness or injury, or the driver is under a cardiac arrest. The occupant state determination unit 52 determines that the driver is in an abnormal state when there is no input to the grip sensor 27 from the driver while in autonomous driving of level 1 or lower that requires the driver to steer the vehicle. Further, the occupant state determination unit 52 may determine the open/closed state of the driver's eyelids from the face image of the driver that is extracted from the output of the internal camera 26. The occupant state determination unit 52 may determine that the driver is asleep, under a strong drowsiness, unconscious or under a cardiac arrest so that the drive is unable to properly drive the vehicle, and the driver is in an abnormal condition when the driver's eyelids are closed for more than a predetermined time period, or when the number of times the eyelids are closed per unit time interval is equal to or greater than a predetermined threshold value. The occupant state determination unit 52 may further acquire the driver's posture from the captured image to determine that the driver's posture is not suitable for the driving operation or that the posture of the driver does not change for a predetermined time period. It may well mean that the driver is incapacitated due to illness or injury, and in an abnormal condition.

In the case of autonomous driving of level 2 or lower, the abnormal condition includes a situation where the driver is neglecting the duty to monitor the environment surrounding the vehicle. This situation may include either the case where the driver is not holding or gripping the steering wheel or the case where the driver's line of sight is not directed in the forward direction. The occupant state determination unit 52 may detect the abnormal condition where the driver is neglecting to monitor the environment surrounding the vehicle when the output signal of the grip sensor 27 indicates that the driver is not holding the steering wheel. The occupant state determination unit 52 may detect the abnormal condition according to the image captured by the internal camera 26. The occupant state determination unit 52 may use a per se known image analysis technique to extract the face region of the driver from the captured image, and then extracts the iris parts (hereinafter, iris) including the inner and outer corners of the eyes and pupils from the extracted face area. The occupant state determination unit 52 may detect the driver's line of sight according to the positions of the inner and outer corners of the eyes, the iris, the outline of the iris, and the like. It is determined that the driver is neglecting the duty to monitor the environment surrounding the vehicle when the driver's line of sight is not directed in the forward direction.

In addition, in the autonomous driving at a level where the drive is not required to monitor the surrounding environment or in the autonomous driving of level 3, an abnormal condition refers to a state in which the driver cannot promptly take over the driving when a driving takeover request is issued to the driver. The state where the driver cannot take over the driving includes the state where the system cannot be monitored, or, in other words, where the driver cannot monitor a screen display that may be showing an alarm display such as when the driver is asleep, and when the driver is not looking ahead. In the present embodiment, in the level 3 autonomous driving, the abnormal condition includes a case where the driver cannot perform the duty of monitoring the surrounding environment of the vehicle even though the driver is notified to monitor the surrounding environment of the vehicle. In the present embodiment, the occupant state determination unit 52 displays a predetermined screen on the display device 31 of the HMI 12, and instructs the driver to look at the display device 31. Thereafter, the occupant state determination unit 52 detects the driver's line of sight with the internal camera 26, and determines that the driver is unable to fulfill the duty of monitoring the surrounding environment of the vehicle if driver's line of sight is not facing the display device 31 of the HMI 12.

The occupant state determination unit 52 may detect if the driver is gripping the steering wheel according to the signal from the grip sensor 27, and if the driver is not gripping the steering wheel, it can be determined that the vehicle is in an abnormal state in which the duty of monitoring the surrounding environment the vehicle is being neglected. Further, the occupant state determination unit 52 determines if the driver is in an abnormal state according to the image captured by the internal camera 26. For example, the occupant state determination unit 52 extracts a driver's face region from the captured image by using a per se known image analysis means. The occupant state determination unit 52 may further extract iris parts (hereinafter, iris) of the driver including the inner and outer corners of the eyes and pupils from the extracted face area. The occupant state determination unit 52 obtains the driver's line of sight according to the extracted positions of the inner and outer corners of the eyes, the iris, the outline of the iris, and the like. It is determined that the driver is neglecting the duty to monitor the environment surrounding the vehicle when the driver's line of sight is not directed in the forward direction.

The state management unit 37 selects the level of the autonomous driving according to at least one of the own vehicle position, the operation of the autonomous driving level switch 13, and the determination result of the abnormal state determination unit 36. Further, the state management unit 37 controls the action plan unit 42 according to the selected autonomous driving level, thereby performing the autonomous driving according to the selected autonomous driving level. For example, when the state management unit 37 has selected the level 1 autonomous driving, and a constant speed traveling control is being executed, the event to be determined by the action plan unit 42 is limited only to the constant speed traveling event.

The state management unit 37 raises and lowers the autonomous driving level as required in addition to executing the autonomous driving according to the selected level.

More specifically, the state management unit 37 raises the level when the condition for executing the autonomous driving at the selected level is met, and an instruction to raise the level of the autonomous driving is input to the autonomous driving level switch 13.

When the condition for executing the autonomous driving of the current level ceases to be satisfied, or when an instruction to lower the level of the autonomous driving is input to the autonomous driving level switch 13, the state management unit 37 executes an intervention request process. In the intervention request process, the state management unit 37 first notifies the driver of a handover request. The notification to the driver may be made by displaying a message or image on the display device 31 or generating a speech or a warning sound from the sound generator 32. The notification to the driver may continue for a predetermined period of time after the intervention request process is started or may be continued until an input is detected by the occupant monitoring device 11.

The condition for executing the autonomous driving of the current level ceases to be satisfied when the vehicle has moved to an area where only the autonomous driving of a level lower than the current level is permitted, or when the abnormal state determination unit 36 has determined that an abnormal condition that prevents the continuation of the autonomous driving of the current level has occurred to the driver or the vehicle.

Following the notification to the driver, the state management unit 37 detects if the internal camera 26 or the grip sensor 27 has received an input from the driver indicating a takeover of the driving. The detection of the presence or absence of an input to take over the driving is determined in a way that depends on the level that is to be selected. When moving to level 2, the state management unit 37 extracts the driver's line of sight from the image acquired by the internal camera 26, and when the driver's line of sight is facing the front of the vehicle, it is determined that an input indicating the takeover of the driving by the driver is received. When moving to level 1 or level 0, the state management unit 37 determines that there is an input indicating an intent to take over the driving when the grip sensor 27 has detected the gripping of the steering wheel by the driver. Thus, the internal camera 26 and the grip sensor 27 function as an intervention detection device that detects an intervention of the driver to the driving. Further, the state management unit 37 may detect if there is an input indicating an intervention of the driver to the driving according to the input to the autonomous driving level switch 13.

The state management unit 37 lowers the autonomous driving level when an input indicating an intervention to the driving is detected within a predetermined period of time from the start of the intervention request process. At this time, the level of the autonomous driving after the lowering of the level may be level 0, or may be the highest level that can be executed.

The state management unit 37 causes the action plan unit 42 to generate a stop event when an input corresponding to the driver's intervention to the driving is not detected within a predetermined period of time after the execution of the intervention request process. The stop event is an event in which the vehicle is brought to a stop at a safe position (for example, an emergency parking zone, a roadside zone, a roadside shoulder, a parking area, etc.) while the vehicle control is degenerated. Here, a series of procedures executed in the stop event may be referred to as MRM (Minimum Risk Maneuver).

When the stop event is invoked, the control unit 15 shifts from the autonomous driving mode to the autonomous stopping mode, and the action plan unit 42 executes the stop process. Hereinafter, an outline of the stop process is described with reference to the flowchart of FIG. 2.

Figure 2:
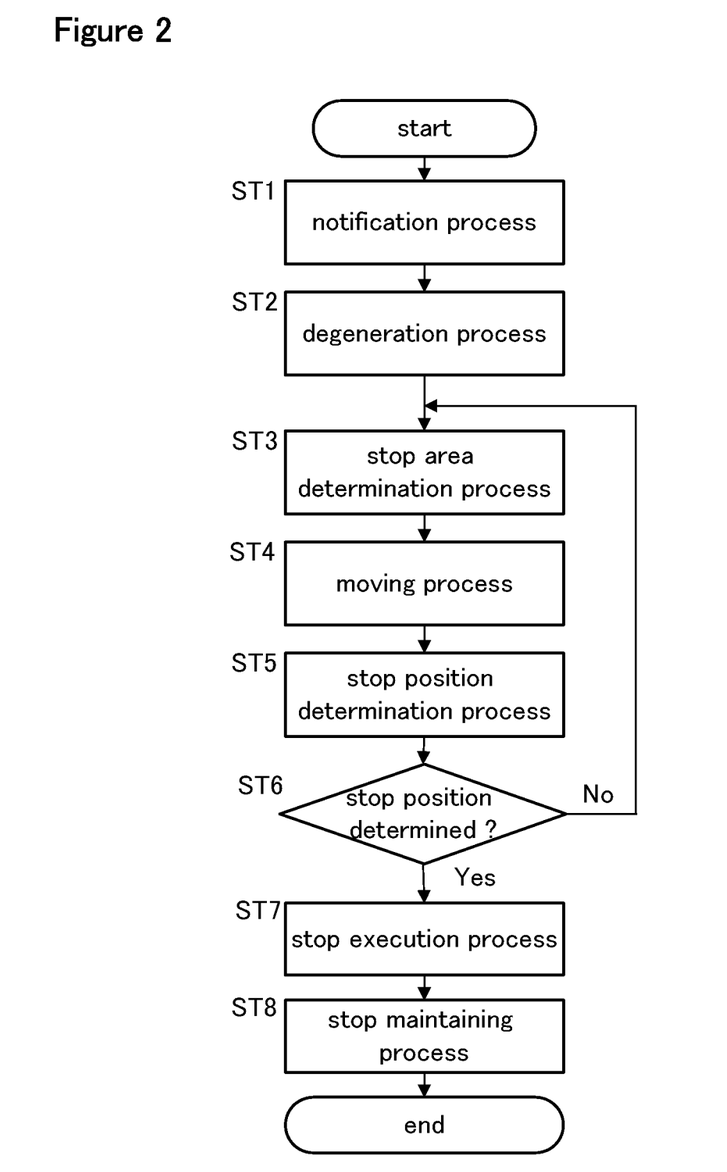
FIG. 2 is a flowchart of a stop process.

In the stop process, a notification process is first executed (step ST1). In the notification process, the action plan unit 42 operates the external notification device 14 to notify the people outside of the vehicle. For example, the action plan unit 42 activates a horn included in the external notification device 14 to periodically generate a warning sound. The notification process continues until the stop process ends. After the notification process has ended, the action plan unit 42 may continue to activate the horn to generate a warning sound depending on the situation.

Then, a degeneration process is executed (step ST2). The degeneration process is a process of restricting events that can be invoked by the action plan unit 42. The degeneration process may prohibit a lane change event to a passing lane, a passing event, a merging event, and the like. Further, in the degeneration process, the speed upper limit and the acceleration upper limit of the vehicle may be more limited in the respective events as compared with the case where the stop process is not performed.

Next, a stop area determination process is executed (step ST3). The stop area determination process refers to the map information according to the current position of the own vehicle, and extracts a plurality of available stop areas (candidates for the stop area or potential stop areas) suitable for stopping, such as road shoulders and evacuation spaces in the traveling direction of the own vehicle. Then, one of the available stop areas is selected as the stop area by taking into account the size of the stop area, the distance to the stop area, and the like.

Next, a moving process is executed (step ST4). In the moving process, a route for reaching the stop area is determined, various events along the route leading to the stop area are generated, and a target trajectory is determined. The travel control unit 38 controls the power unit 3, the brake device 4, and the steering device 5 according to the target trajectory determined by the action plan unit 42. The vehicle then travels along the route and reaches the stop area.

Next, a stop position determination process is executed (step ST5). In the stop position determination process, the stop position is determined according to obstacles, road markings, and other objects located around the vehicle recognized by the external environment recognition unit 40. In the stop position determination process, it is possible that the stop position cannot be determined in the stop area due to the presence of surrounding vehicles and obstacles. When the stop position cannot be determined in the stop position determination process (No in step ST6), the stop area determination process (step ST3), the movement process (step ST4), and the stop position determination process (step ST5) are sequentially repeated.

If the stop position can be determined in the stop position determination process (Yes in step ST6), a stop execution process is executed (step ST7). In the stop execution process, the action plan unit 42 generates a target trajectory according to the current position of the vehicle and the targeted stop position. The travel control unit 38 controls the power unit 3, the brake device 4, and the steering device 5 according to the target trajectory determined by the action plan unit 42. The vehicle then moves toward the stop position and stops at the stop position.

After the stop execution process is executed, a stop maintaining process is executed (step ST8). In the stop maintaining process, the travel control unit 38 drives the parking brake device according to a command from the action plan unit 42 to maintain the vehicle at the stop position. Thereafter, the action plan unit 42 may transmit an emergency call to the emergency call center by the communication device 8. When the stop maintaining process is completed, the stop process ends.

The control unit 15 executes the stop process when the driver has become unable to drive the vehicle (for example, when the driver has lost consciousness) or when a failure in the vehicle control system 1 is detected. An MRM is performed under such a situation. Thereby, the vehicle is brought to a stop in a stop area which is selected so as to minimize the risk to the vehicle or to the surrounding vehicles and pedestrians. However, the stop process may be initiated even when the driver is quite capable of driving the vehicle due to a deliberate negligence or a lack of attention on the part of the driver when a handover request is made to the driver, and the driver fails to respond to the request in a proper manner. If the driver is capable of driving the vehicle in response to a request to take over the responsibility of driving of the vehicle (handover request), it is preferable to have the driver take over the driving, instead of the control unit autonomously bringing the vehicle to a stop in a selected stop area, in view of minimizing the risk. Therefore, it is desirable to encourage the driver to take over the driving without fail when a handover request is made.

In the following disclosure, an operation mode that does not require the intervention of the driver, such as autonomous driving of level 3, is referred to as an autonomous driving mode, and an operation mode based on MRM is referred to as an autonomous stopping mode. The autonomous stopping mode is activated when the driver fails to acknowledge a request for intervention (handover request) within a prescribed time period after a handover request is made via a notification interface such as the display unit 31 and the sound generator 32. The acknowledgement of the handover request may be detected when the autonomous driving level switch 13 is operated or when the input interface 33 detects an input thereto. When the autonomous stopping mode is activated, the control unit 15 autonomously drives the vehicle to the stop position of the selected stop area (steps ST3 to ST7 in FIG. 2).

Figure 3:
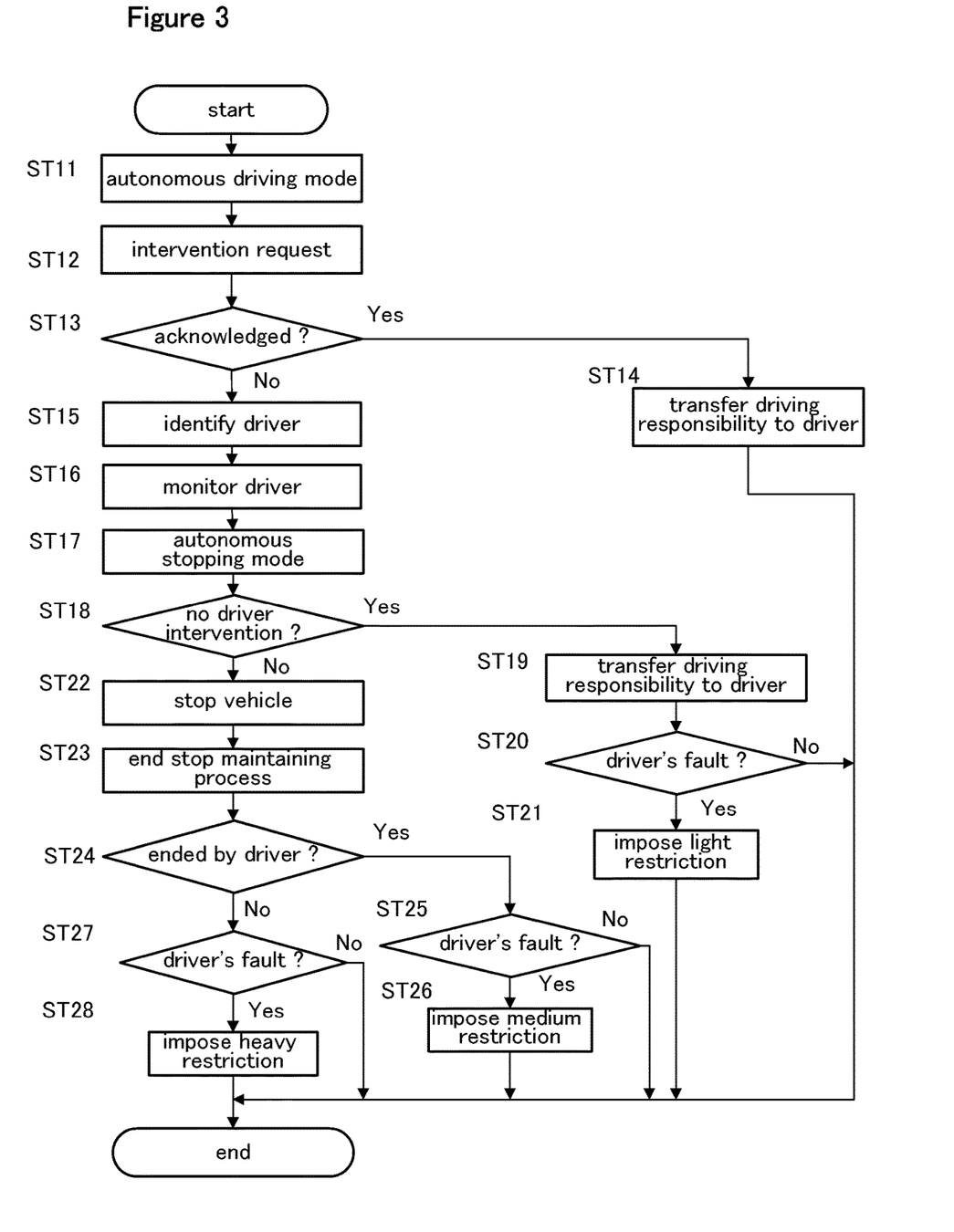
FIG. 3 is a flowchart of a restriction process to restrict a functionality of autonomous driving.

A restriction process executed by the control unit 15 to restrict a functionality of autonomous driving is described in the following with reference to FIG. 1 and FIG. 3.

When the driver operates the autonomous driving level switch 13 to activate the autonomous driving function of the vehicle, and predetermined conditions are satisfied, the autonomous driving mode is activated or invoked (step ST11). For example, in executing autonomous driving of level 3 on an expressway as the vehicle approaches a target exit on an expressway, the control unit 15 issues a handover request to the driver via a notification interface such as the display device 31 and the sound generator 32 (step ST12).

Upon detecting the acknowledgement or the acceptance by the driver to take over the responsibility of driving (via the operation of the autonomous driving level switch 13 and the input interface 33) (the determination of step ST13 is Yes), the control unit 15 determines that the driver has accepted the driving responsibility (step ST14), and the restriction process is ended. On the other hand, when the driver does not perform such an operation, the control unit 15 determines that the driver has not accepted the driving responsibility (the determination result of step ST13 is No). In this case, the control unit identifies the driver (step ST15), and acquires the state of the driver (step ST16). Thereafter, the autonomous stopping mode is initiated (step ST17).

The identification of the driver (step ST15) is executed for the purpose of managing the restriction on the functionality of autonomous driving for each driver. The identification of the driver is performed by a driver identification unit 61 of the control unit 15 based on the image of the driver captured by the internal camera 26, and the identification result is stored in the storage unit 39. The identification of the driver may be performed when the driver gets aboard the vehicle, or may be performed based on other information such as a comparison of the current driving pattern with a past driving pattern stored in the storage unit 39, instead of the image captured by the internal camera 26.

The monitoring of the state of the driver (step ST16) is used as information for determining the reason why the driver failed to accept the transfer of the driving responsibility is intentional (deliberate) or accidental, or another cause (steps ST20, ST25 and ST27). If the failure to accept the transfer of the driving responsibility is not a driver's fault such as when the driver has lost consciousness, there is no reason to penalize the driver. However, the driver may fail to notice the intervention request because the driver is preoccupied with a second task such as operating a smartphone or watching a movie, or is asleep. In such a case, it is proper to penalize the driver for the negligence.

Even when the vehicle is traveling in the autonomous stopping mode, the driver may intervene in the driving (Yes in step ST18), and the driving responsibility is transferred to the driver (step ST19). When the driver failed to accept the intervention request before shifting to the autonomous stopping mode due to an intention or negligence on the part of the driver (Yes in step ST20), the control unit 15 imposes a light restriction on the functionality of autonomous driving (step ST21). The light restriction, for example, may consist of prohibiting autonomous driving of level 3 other than following a preceding vehicle on a congested road even though the vehicle may be equipped to travel under autonomous driving of level 3. If the failure to accept the intervention request before transitioning to the autonomous stopping mode was not deliberate or due to negligence on the part of the driver (No in step ST20), the control unit 15 does not impose any restriction on the functionality of autonomous driving before ending the restriction process.

When the vehicle comes to a stop (step ST22), a stop maintaining process (see step ST8 in FIG. 2) is executed. The vehicle stop maintaining process is canceled (step ST23) when the driver, a fellow occupant, or an outsider performs a certain operation such as operating the shift lever and releasing the door lock. When the stop maintaining process is canceled by the driver (Yes in step ST24), it is determined in step ST25 if the cause of not accepting the intervention request before shifting to the autonomous stopping mode is due to the driver's fault. If the failure to accept the intervention request is due to the driver's fault (Yes in step ST25), the control unit 15 imposes a medium restriction on the functionality of autonomous driving (step ST26) before this process is ended. In step ST25, the failure to accept the intervention request is not due to the driver's fault, the control unit 15 ends the restriction process without imposing any new restriction on the functionality of autonomous driving. The medium restriction, for example, may consist of prohibiting the execution of autonomous driving of level 3 (by limiting to autonomous driving of level 2). In level 2 autonomous driving, the driver is allowed to release his hand from the steering wheel, but is required to monitor the surrounding environment.

When the stop maintaining process is canceled by a person other than the driver (No in step ST24), it is determined in step ST27 if the cause of not accepting the intervention request before shifting to the autonomous stopping mode is due to the driver's fault. If the failure to accept the intervention request is due to the driver's fault (Yes in step ST27), a heavy restriction is imposed on the functionality of autonomous driving in step ST28 before ending the restriction process. The heavy restriction, for example, may consist of prohibiting the execution of autonomous driving of level 3 (by limiting to autonomous driving of level 2), and the driver is additionally required to keep the grip on the steering wheel.

The control unit 15 outputs the content of the restricted functionality and/or the content of the unrestricted functionality to a notification interface such as the display device 31 and the sound generator 32 to notify the driver of the content. The control unit 15 releases or removes such restrictions of the functionality after a predetermined time period has elapsed and/or when the vehicle has been used a predetermined number of times. Here, the predetermined time period may be determined based on the use time of the vehicle, a time period unrelated to the use of the vehicle, or a combination thereof. In addition, the number of times of use of the vehicle may be computed from the frequency of the ignition cycles (from the time turning on the ignition to the time turning off the ignition), the number of times that the driver is seated in the driver's seat as detected by the seat sensor, the number of times the driver's seat door is opened and closed, the number of incidences of each driver using the vehicle as determined by the driver identification unit 61 based on the image captured by the indoor camera 26, or a combination thereof. In addition, such a restriction on the functionality may be removed by an authorized party such as a car dealer or a car sales person. By allowing the restriction of the functionality to be removed in such a manner, the driver can be encouraged to properly accept the driving intervention request without being unduly inconvenienced.

As described above, the driver is motivated to accept the driving intervention request because of the penalty of restricting the autonomous driving functionality, and is encouraged to accept the driving invention request in a timely fashion.

The present invention has been described in terms of a specific embodiment, but is not limited by such embodiment, but can be modified in various ways without departing from the scope of the present invention. The present invention can be applied not only to the autonomous stopping mode of level 3 autonomous driving, but the autonomous stopping mode of autonomous driving of other levels.

The invention claiemd is:

1. A vehicle control system configured for autonomous driving, comprising:
    a control unit for steering, accelerating and decelerating a vehicle;
    a notification interface configured to notify a driving intervention request to a driver under command from the control unit;
    an intervention detection unit configured to detect an acceptance of the driving intervention request by the driver; and
    an occupant monitoring device configured to monitor the driver,
    wherein the autonomous driving includes an autonomous driving mode in which the vehicle is operated without requiring an intervention of the driver at least in regard to steering or acceleration/deceleration of the vehicle, and an autonomous stopping mode in which the vehicle is brought to a stop in a prescribed stop area when it is detected that the control unit or the driver has become incapable of properly maintaining a traveling state of the vehicle; and
    wherein the control unit invokes the autonomous stopping mode when the intervention detection unit has failed to detect an acceptance of the driving intervention request by the driver when the driving intervention request is notified by the notification interface,
    wherein the control unit includes an occupant state determination unit to determine a state of the driver according to information obtained from the occupant monitoring device, the occupant state determination unit determining whether a reason why the driver failed to accept a transfer of driving responsibility is an intention or negligence of the driver or not,
    (i) wherein, when the intervention detection unit has failed to detect an acceptance of the driving intervention request by the driver due to the intention or negligence of the driver so that the autonomous stopping mode has been invoked and the driver intervenes in the driving while the vehicle is traveling in the autonomous stopping mode, the control unit restricts functionality of the autonomous driving,
    (ii) wherein, when the intervention detection unit has failed to detect the acceptance of the driving intervention request by the driver due to the intention or negligence of the driver so that the autonomous stopping mode has been invoked and the driver does not intervene in the driving until the vehicle in the autonomous stopping mode is stopped, the control unit restricts the functionality of the autonomous driving to a greater extent than in case (i), and
    (iii) wherein, when the intervention detection unit has failed to detect the acceptance of the driving intervention request by the driver not due to the intention nor negligence of the driver so that the autonomous stopping mode has been invoked, the control unit does not impose any restriction on the functionality of the autonomous driving.

2. The vehicle control system according to claim 1, further comprising a driver identification unit configured to identify the driver, the control unit being configured to manage a restriction extent to which the functionality of the autonomous driving has been restricted for each identified driver.

3. The vehicle control system according to claim 1, wherein the functionality is restricted to a greater extent when a person other than the driver has deactivated the autonomous stopping mode than when the driver has deactivated the autonomous stopping mode.

4. The vehicle control system according to claim 1, wherein the control unit is configured to allow the restricted functionality to be unrestricted by an authorized party.

5. The vehicle control system according to claim 1, wherein the control unit is configured to allow the restricted functionality to be unrestricted with elapsing of time.

6. The vehicle control system according to claim 1, wherein the control unit is configured to allow the restricted functionality to be unrestricted with an increase in a number of incidences of using the vehicle.

7. The vehicle control system according to claim 1, wherein the control unit is configured to output contents of a part of the functionality that is restricted and/or a part of the functionality that is not restricted.

* * * * *